United States Patent
Kim et al.

(10) Patent No.: US 11,173,778 B2
(45) Date of Patent: Nov. 16, 2021

(54) POWER TRAIN FOR ELECTRIC VEHICLE

(71) Applicants: Hyundai Motor Company, Seoul (KR); Kia Motors Corporation, Seoul (KR)

(72) Inventors: Jin Ho Kim, Suwon-Si (KR); Jae Joon Lee, Anyang-Si (KR); Jong Sool Park, Hwaseong-Si (KR); Jin Young Hwang, Yongin-Si (KR); Jong Sung Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/882,299

(22) Filed: May 22, 2020

(65) Prior Publication Data
US 2021/0178888 A1 Jun. 17, 2021

(30) Foreign Application Priority Data
Dec. 12, 2019 (KR) .......................... 10-2019-0165278

(51) Int. Cl.
*B60K 6/365* (2007.10)
*B60K 6/40* (2007.10)
*F16H 3/72* (2006.01)
*F16H 3/00* (2006.01)

(52) U.S. Cl.
CPC ................ *B60K 6/365* (2013.01); *B60K 6/40* (2013.01); *F16H 3/728* (2013.01)

(58) Field of Classification Search
CPC .......... B60K 6/365; B60K 6/40; F16H 3/728; F16H 3/66; F16H 3/666; F16H 3/006; F16H 2200/2005
See application file for complete search history.

(56) References Cited

U.S. PATENT DOCUMENTS

| | | | |
|---|---|---|---|
| 5,775,449 A | 7/1998 | Moroto et al. | |
| 6,958,028 B2* | 10/2005 | Janson | F16H 3/006 475/207 |
| 7,469,609 B2* | 12/2008 | Baldwin | F16H 3/006 74/330 |

(Continued)

FOREIGN PATENT DOCUMENTS

| KR | 10-2013-0117184 A | 10/2013 |
|---|---|---|
| KR | 10-2014-0118028 A | 10/2014 |

OTHER PUBLICATIONS

U.S. Appl. No. 16/887,267, filed May 29, 2020.
(Continued)

*Primary Examiner* — Tinh Dang
(74) *Attorney, Agent, or Firm* — Morgan, Lewis & Bockius LLP

(57) ABSTRACT

A power train apparatus for an electric vehicle may include a planetary gear set including three rotation elements having a first rotation element, a second rotation element and a third rotation element, wherein the first rotation element is fixedly connected to a first shaft and the second rotation element is fixedly connected to a second shaft; a motor; a first transmission device mounted to selectively transfer power of the motor to the first shaft in a plurality of gear ratios; and a second transmission device provided to selectively transfer the power of the motor to the first shaft or the second shaft.

14 Claims, 2 Drawing Sheets

(56) References Cited

U.S. PATENT DOCUMENTS

| | | | |
|---|---|---|---|
| 8,051,732 B2 * | 11/2011 | Gitt | F16H 37/046 |
| | | | 74/331 |
| 9,260,109 B2 | 2/2016 | Tanaka | |
| 9,346,462 B2 * | 5/2016 | Park | B60W 20/40 |
| 9,528,583 B2 * | 12/2016 | Lubke | B60W 10/111 |
| 10,081,240 B2 * | 9/2018 | Lee | F16H 37/065 |
| 2002/0088291 A1 * | 7/2002 | Bowen | B60W 10/113 |
| | | | 74/339 |
| 2003/0100395 A1 | 5/2003 | Hiraiwa | |
| 2005/0204837 A1 * | 9/2005 | Janson | F16H 37/042 |
| | | | 74/325 |
| 2006/0025272 A1 | 2/2006 | Pelouch | |
| 2007/0149334 A1 | 6/2007 | Holmes et al. | |
| 2008/0108467 A1 | 5/2008 | Hiraki et al. | |
| 2008/0194369 A1 | 8/2008 | Boutou et al. | |
| 2008/0200296 A1 | 8/2008 | Holmes | |
| 2009/0151491 A1 | 6/2009 | Tabata et al. | |
| 2010/0051360 A1 | 3/2010 | Oba et al. | |
| 2010/0160103 A1 | 6/2010 | Holmes | |
| 2011/0184612 A1 * | 7/2011 | Fujii | B60W 10/02 |
| | | | 701/54 |
| 2012/0316738 A1 * | 12/2012 | Teslak | B60W 10/115 |
| | | | 701/53 |
| 2015/0068336 A1 | 3/2015 | Peterson | |
| 2016/0167639 A1 | 6/2016 | Hori et al. | |
| 2016/0312857 A1 * | 10/2016 | Wechs | F16H 3/54 |
| 2017/0009862 A1 | 1/2017 | Gumpoldsberger | |
| 2017/0159779 A1 | 6/2017 | Hwang | |
| 2017/0282700 A1 | 10/2017 | Bergquist et al. | |
| 2018/0099561 A1 | 4/2018 | Xu et al. | |
| 2019/0118635 A1 | 4/2019 | Hwang | |
| 2020/0047602 A1 | 2/2020 | Chae | |

OTHER PUBLICATIONS

U.S. Appl. No. 16/884,306, filed May 27, 2020.
U.S. Appl. No. 16/884,332, filed May 27, 2020.
U.S. Appl. No. 16/993,436, filed Aug. 14, 2020.

* cited by examiner

FIG. 2

| GEAR-SHIFT STAGE | CL1 | CL2 | SH1 | | SH2 | | SH3 | |
|---|---|---|---|---|---|---|---|---|
| | | | S1 | S3 | S2 | S4 | low | high |
| 1 | ● | | ● | | | | ● | |
| 2 | | ● | | | ● | | ● | |
| 3 | ● | | | ● | | | ● | |
| 4 | | ● | | | | ● | ● | (*) |
| 5 | ● | | ● | | | | | ● |
| 6 | | ● | | | ● | | | ● |
| 7 | ● | | | ● | | | | ● |

POWER TRAIN FOR ELECTRIC VEHICLE

CROSS REFERENCE TO RELATED APPLICATION

The present application claims priority to Korean Patent Application No. 10-2019-0165278, filed Dec. 12, 2019, the entire contents of which is incorporated herein for all purposes by this reference.

BACKGROUND OF THE INVENTION

Field of the Invention

The present invention relates to a power train mounted on an electric vehicle.

Description of Related Art

An electric vehicle, which is a vehicle using an electric motor to supply power for a driving force of the vehicle, does not generate exhaust gas. Thus, the electric vehicle may contribute greatly as a solution to environmental pollution in large cities.

To popularize the electric vehicle as described above, it is required to improve various technologies. In particular, there is a demand for technologies capable of drastically improving an allowable travelling distance after a one-time charge.

To increase the allowable travelling distance as described above, it is necessary to not only improve power efficiency (a travelling distance per unit power, km/kWh) while the motor mounted on the electric vehicle has a reduced size and volume but also satisfy the maximum hill-climbing ability and the best speed performance required for the vehicle. Thus, a transmission is mounted to do so.

For the reason described above, the transmission mounted on the electric vehicle is capable of not only achieving high power transmission efficiency while having a configuration as simple as possible, but also not causing a torque interruption, by which a torque to be transferred to a driving wheel is disconnected, and a gear-shift shock at the time of gear shifting.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power train for an electric vehicle configured for: not only providing a plurality of gear-shift ratios, making it possible to reduce a volume of a motor, but also satisfying the maximum hill-climbing ability and the best speed performance required for the vehicle; achieving high power transmission efficiency while having a relatively simple configuration and a small weight, improving power efficiency of the vehicle; and reducing or preventing a torque interruption and a gear-shift shock.

According to an exemplary embodiment of the present invention, a power train for an electric vehicle includes: a planetary gear set including three rotation elements having a first rotation element, a second rotation element and a third rotation element, wherein the first rotation element is fixedly connected to a first shaft and the second rotation element is fixedly connected to a second shaft; a motor; a first transmission device mounted to selectively transfer power of the motor to the first shaft in a plurality of gear ratios; and a second transmission device provided to selectively transfer the power of the motor to the first shaft or the second shaft.

A third rotation element of the planetary gear set may be connected to a third shaft; and the third shaft may be configured to be fixed to a transmission housing.

Any two of the three rotation elements of the planetary gear set may be connected to each other to rotate the first rotation element, the second rotation element and the third rotation element of the planetary gear set integrally.

A third transmission device may be provided to selectively switch between a state in which the third shaft is fixed to the transmission housing and a state in which the third shaft is connected to the second shaft.

The power train for an electric vehicle may include a power distribution device provided to selectively transfer the power of the motor to the first transmission device or the second transmission device.

The power distribution device may include a first clutch and a second clutch provided on a fourth shaft and a fifth shaft, respectively, to each independently regulate a rotation shaft of the motor, the fourth shaft and the fifth shaft being aligned to be coaxial with each other.

The first transmission device may be mounted on a sixth shaft connected to the fourth shaft in an external gear manner and parallel to the first shaft.

A first gear may be provided on the fourth shaft; a second gear may be provided on the sixth shaft to be engaged with the first gear; a fifth gear and a sixth gear may be rotatably mounted on the sixth shaft and engaged respectively with a third gear and a fourth gear fixed on the first shaft; and the first transmission device may include a sleeve selectively connecting a clutch gear of the fifth gear or a clutch gear of the sixth gear to a hub constrained from rotating on the sixth shaft.

The second transmission device may be mounted on a seventh shaft connected to the fifth shaft in the external gear manner and parallel to the first shaft.

A seventh gear may be provided on the fifth shaft; an eighth gear may be provided on the seventh shaft to be engaged with the seventh gear; an eleventh gear and a twelfth gear may be rotatably mounted on the seventh shaft and engaged with a ninth gear and a tenth gear, respectively, the ninth gear being constrained from rotating on the first shaft and the tenth gear being constrained from rotating on the second shaft; and the second transmission device may include a sleeve selectively connecting a clutch gear of the eleventh gear or a clutch gear of the twelfth gear to a hub constrained from rotating on the seventh shaft.

According to various exemplary embodiments of the present invention, a power train for an electric vehicle includes: a planetary gear set including three rotation elements having a first rotation element, a second rotation element and a third rotation element, wherein the first rotation element is connected to a first shaft, the second rotation element is connected to a second shaft, and the third rotation element is connected to a third shaft; a motor; a first transmission device mounted to selectively transfer power of the motor to the first shaft in a plurality of gear ratios; a second transmission device provided to selectively transfer the power of the motor to the first shaft or the second shaft; and a power distribution device provided to distribute the power of the motor to the first transmission device and the second transmission device. Any two of the three rotation elements of the planetary gear set may be connected to each other, and the third rotation element of the planetary gear set may be configured to be fixable to a transmission housing.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table summarizing operation modes for gear-shifting stages implemented by the power train of FIG. 1.

Figure 1:
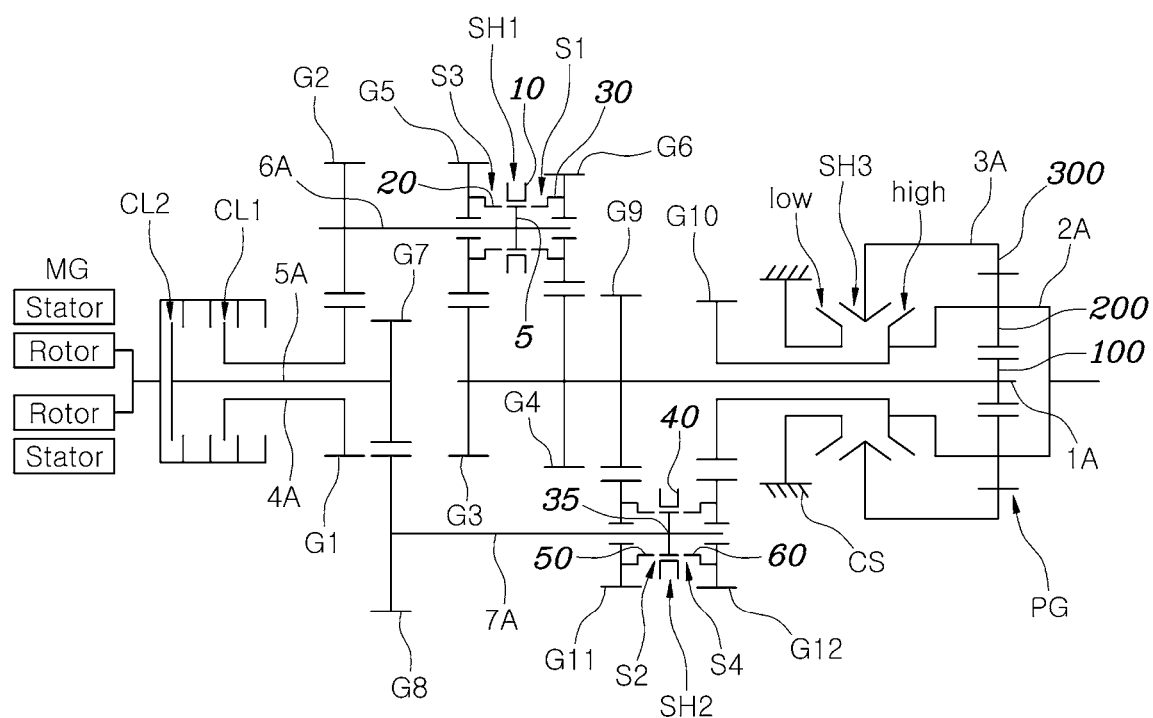
FIG. 1 is a view exemplarily illustrating various exemplary embodiments of a power train for an electric vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, in according to an exemplary embodiment of the present invention, a power train for an electric vehicle includes: a planetary gear set PG including three rotation elements whose first rotation element 100 is connected to a first shaft 1A and a second rotation element 200 is connected to a second shaft 2A; a motor MG; a first transmission device SH1 mounted to selectively transfer power of the motor MG to the first shaft 1A in a plurality of gear ratios; and a second transmission device SH2 provided to selectively transfer the power of the motor MG to the first shaft 1A or the second shaft 2A.

A third rotation element 300 of the planetary gear set PG is connected to a third shaft 3A, and the third shaft 3A is configured to be fixed to a transmission housing CS.

Furthermore, any two of the three rotation elements of the planetary gear set PG are connected to each other to rotate all the rotation elements of the planetary gear set PG integrally.

In the exemplary embodiment of the present invention, a third transmission device SH3 is provided to selectively switch between a state in which the third shaft 3A is fixed to the transmission housing CS and a state in which the third shaft 3A is connected to the second shaft 2A, performing not only to fix the third shaft 3A to the transmission housing CS but also to connect any two rotation elements of the planetary gear set PG to each other to integrate the planetary gear set PG.

Furthermore, in the exemplary embodiment of the present invention, a power distribution device is provided to transfer the power of the motor MG to the first transmission device SH1 and/or the second transmission device SH2.

That is, in an exemplary embodiment of the present invention, when the first shaft 1A is considered as an input shaft receiving the power from the motor MG, and the second shaft 2A is considered as an output shaft configured for not only receiving the power from the motor MG but also outputting the power, the power of the motor MG is distributed to the first transmission device SH1 and the second transmission device SH2 by the power distribution device. The power of the motor MG inputted to the first shaft 1A through the first transmission device SH1 and the power of the motor MG inputted to the first shaft 1A or the second shaft 2A through the second transmission device SH2 are outputted through the second shaft 2A after being adjusted by the planetary gear set PG.

For reference, the first shaft 1A, the second shaft 2A, and the third shaft 3A, all of which are rotation shafts of the rotation elements of the planetary gear set PG, are mounted to be coaxial with each other. In the planetary gear set PG, the first rotation element may be expressed as a sun gear S, the second rotation element may be expressed as a planet carrier C, and the third rotation element may be expressed as a ring gear R.

The power distribution device includes a first clutch CL1 and a second clutch CL2 provided on a fourth shaft 4A and a fifth shaft 5A, respectively, to each independently regulate a rotation shaft of the motor MG, the fourth shaft 4A and the fifth shaft 5A being aligned to be coaxial with each other.

The first clutch CL1 and the second clutch CL2 may be configured as a dual clutch in a single package as illustrated in FIG. 1. Since the first clutch CL1 and the second clutch CL2 may independently connect or disconnect the power of the motor MG to/from the fourth shaft 4A and the fifth shaft 5A, respectively, as described above, it is possible to implement both a state in which the power of the motor MG is transferred to the fourth shaft 4A or the fifth shaft 5A and a state in which the power of the motor MG is transferred to the fourth shaft 4A and the fifth shaft 5A simultaneously.

The first transmission device SH1 is mounted on a sixth shaft 6A connected to the fourth shaft 4A in an external gear manner and parallel to the first shaft 1A.

That is, a first gear G1 is provided on the fourth shaft 4A; a second gear G2 is provided on the sixth shaft 6A to be engaged with the first gear G1; a fifth gear G5 and a sixth gear G6 are rotatably mounted on the sixth shaft 6A and engaged with a third gear G3 and a fourth gear G4, respectively, the third gear G3 and the fourth gear G4 being constrained from rotating on the first shaft 1A; and the first transmission device SH1 includes a sleeve selectively connecting a clutch gear of the fifth gear G5 or a clutch gear of the sixth gear G6 to a hub 5 constrained from rotating on the sixth shaft 6A.

Thus, in a state in which the power of the motor MG is transferred to the sixth shaft 6A by engaging the first clutch CL1, the power of the motor MG is transferred to the first shaft 1A through the fifth gear G5 and the third gear G3 when the sleeve 10 of the first transmission device SH1 is engaged with the clutch gear 20 of the fifth gear G5, and the power of the motor MG is transferred to the first shaft 1A through the sixth gear G6 and the fourth gear G4 when the sleeve 10 of the first transmission device SH1 is engaged with the clutch gear 30 of the sixth gear G6.

In the instant case, a gear ratio formed by the third gear G3 and the fifth gear G5 is different from that formed by the fourth gear G4 and the sixth gear G6. Based thereon, the first transmission device SH1 may transfer the power of the motor MG to the first shaft 1A at two different gear ratios.

The second transmission device SH2 is mounted on a seventh shaft 7A connected to the fifth shaft 5A in the external gear manner and parallel to the first shaft 1A.

That is, a seventh gear G7 is provided on the fifth shaft 5A; an eighth gear G8 is provided on the seventh shaft 7A to be engaged with the seventh gear G7; an eleventh gear G11 and a twelfth gear G12 are rotatably mounted on the seventh shaft 7A and engaged with a ninth gear G9 and a tenth gear G10, respectively, the ninth gear G9 being constrained from rotating on the first shaft 1A and the tenth gear G10 being constrained from rotating on the second shaft 2A; and the second transmission device SH2 includes a sleeve 40 selectively connecting a clutch gear 50 of the eleventh gear G11 or a clutch gear 60 of the twelfth gear G12 to a hub 35 constrained from rotating on the seventh shaft 7A.

Thus, in a state in which the power of the motor MG is transferred to the seventh shaft 7A by engaging the second clutch CL2, the power of the motor MG is transferred to the first shaft 1A through the eleventh gear G11 and the ninth gear G9 when the sleeve of the second transmission device SH2 is engaged with the clutch gear of the eleventh gear G11, and the power of the motor MG is transferred to the second shaft 2A through the twelfth gear G12 and the tenth gear G10 when the sleeve of the second transmission device SH2 is engaged with the clutch gear of the twelfth gear G12.

FIG. 2 is a table summarizing operation modes for first to seventh gear-shifting stages implemented by the power train for an electric vehicle according to an exemplary embodiment of the present invention configured as described above. With reference thereto, gear-shift processes of the power train according to an exemplary embodiment of the present invention will be described.

In the operation mode table, "S1" is for expressing that the sleeve of the first transmission device SH1 is regulated together with the clutch gear of the sixth gear G6 and may be considered as a clutch for implementing the first and fifth gear-shifting stages, "S2" is for expressing that the sleeve of the second transmission device SH2 is regulated together with the clutch gear of the eleventh gear G11 and may be considered as a clutch for implementing the second and sixth gear-shifting stages, "S3" is for expressing that the sleeve of the first transmission device SH1 is regulated together with the clutch gear of the fifth gear G5 and may be considered as a clutch for implementing the third and seventh gear-shifting stages, and "S4" is for expressing that the sleeve of the second transmission device SH2 is regulated together with the clutch gear of the twelfth gear G12 and may be considered as a clutch for implementing the fourth gear-shifting stage.

In a low state of the third transmission device SH3, the third shaft 3A is fixed to the transmission housing CS such that the planetary gear set PG decelerates the power inputted to the first shaft 1A and outputs the decelerated power to the second shaft 2A. In a high state of the third transmission device SH3, the third shaft 3A is connected to the second shaft 2A to output the power inputted to the first shaft 1A or the second shaft 2A as it is to the second shaft 2A.

Here, the third transmission SH3 is continuously maintained in the low state during the first to fourth gear-shifting stages, changed to the high state at the fourth stage, and then continuously maintained in the high state during the remaining high stages, i.e., the fifth to seventh gear-shifting stages.

Concerning the first to fourth gear-shifting stages, while the third transmission device SH3 is continuously maintained in the low state as described above, the sleeve of the first transmission device SH1 is engaged with the clutch gear of the sixth gear G6 when the first gear-shifting stage is implemented, the sleeve of the second transmission device SH2 is engaged with the clutch gear of the eleventh gear G11 when the second gear-shifting stage is implemented, the sleeve of the first transmission device SH1 is engaged with the clutch gear of the fifth gear G5 when the third gear-shifting stage is implemented, and the sleeve of the second transmission device SH2 is engaged with the clutch gear of the twelfth gear G12 when the fourth gear-shifting stage is implemented.

That is, in a state in which the first transmission device SH1 is mounted to implement the first and third gear-shifting stages and the second transmission device SH2 is mounted to implement the second and fourth gear-shifting stages, the first clutch CL1 and the second clutch CL2 are alternately engaged to implement the first to fourth gear-shifting stages.

This is a so-called "clutch to clutch" gear shifting implemented by releasing the first clutch CL1 and engaging the second clutch CL2 at the same time after engaging the gear for the second gear-shifting stage with the second transmission device SH2 in advance while driving at the first gear-shifting stage with the first transmission device SH1, facilitating smooth gear shifting without a torque interruption. The gear shifting processes at the remaining second to fourth gear-shifting stages are performed on the basis of the same principle.

At the fourth gear-shifting stage, the third transmission device SH3 is in the low state immediately after the gear shifting from the third gear-shifting stage to the fourth gear-shifting stage, but the third transmission device SH3 may be switched to the high state during the fourth gear-shifting stage in advance for gear shifting to the fifth gear-shifting stage.

In the instant case, the power from the motor MG is transferred to the second shaft 2A through the twelfth gear G12 and the tenth gear G10 and the transferred power is outputted as it is. Thus, the third transmission device SH3 may be changed from the low state to the high state without a torque interruption.

In the gear shifting processes from the fourth gear-shifting stage to the seventh gear-shifting stage, while the third transmission device SH3 is maintained in the high state, the sleeve of the first transmission device SH1 is engaged with the clutch gear of the sixth gear G6 when the fifth gear-shifting stage is implemented, the sleeve of the second transmission device SH2 is engaged with the clutch gear of the eleventh gear G11 when the sixth gear-shifting stage is implemented, and the sleeve of the first transmission device SH1 is engaged with the clutch gear of the fifth gear G5 when the seventh gear-shifting stage is implemented.

Of course, the gear shifting is substantially achieved by releasing any one of the first clutch CL1 and the second clutch CL2 and engaging the other one at the same time in a state in which the gears are engaged as described above, and no torque interruption occurs during the gear shifting.

According to an exemplary embodiment of the present invention, it is possible to not only provide a plurality of gear-shift ratios, making it possible to reduce a volume of the motor, but also satisfy the maximum hill-climbing ability and the best speed performance required for the vehicle; it is possible to achieve high power transmission efficiency with a relatively simple configuration and a small weight, improving power efficiency of the vehicle; and it is possible to reduce or prevent a torque interruption and a gear-shift shock.

Although the present invention has been shown and described with respect to specific embodiments, it will be apparent to those having ordinary skill in the art that the present invention may be variously modified and altered without departing from the spirit and scope of the present invention as defined by the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power train apparatus for a vehicle, the power train apparatus comprising:
   a planetary gear set including three rotation elements having a first rotation element, a second rotation element and a third rotation element, wherein the first rotation element is fixedly connected to a first shaft and the second rotation element is fixedly connected to a second shaft;
   a motor;
   a first transmission device mounted to selectively transfer power of the motor to the first shaft in a plurality of gear ratios;
   a second transmission device provided to selectively transfer the power of the motor to the first shaft or the second shaft; and
   a clutch device provided to selectively transfer the power of the motor to the first transmission device or the second transmission device,
   wherein the clutch device includes a first clutch operably mounted on a third shaft to selectively connect the motor to the third shaft and a second clutch operably mounted on a fourth shaft to selectively connect the motor to the fourth shaft,
   wherein the third shaft and the fourth shaft are aligned to be concentric with each other, and
   wherein the first transmission device is mounted on a fifth shaft connected to the third shaft engaged to and parallel to the first shaft,
   wherein a first gear is mounted on the third shaft,
   wherein a second gear is mounted on the fifth shaft to be engaged with the first gear,
   wherein a fifth gear and a sixth gear are rotatably mounted on the fifth shaft and respectively engaged to a third gear and a fourth gear fixed on the first shaft,
   wherein the second transmission device is mounted on a sixth shaft engaged to the fourth shaft and parallel to the first shaft,
   wherein a seventh gear is mounted on the fourth shaft,
   wherein an eighth gear is mounted on the sixth shaft to be engaged with the seventh gear, and
   wherein an eleventh gear and a twelfth gear are rotatably mounted on the sixth shaft and engaged with a ninth gear and a tenth gear, respectively, the ninth gear being fixed on the first shaft and the tenth gear being fixed on the second shaft.

2. The power train apparatus for the vehicle of claim 1, wherein the third rotation element of the planetary gear set is connected to a seventh shaft; and
   wherein the seventh shaft is configured to be selectively connectable to a transmission housing.

3. The power train apparatus for the vehicle of claim 2, wherein two of the three rotation elements of the planetary gear set are configured to be selectively connectable to each other to rotate the first rotation element, the second rotation element and the third rotation element of the planetary gear set integrally.

4. The power train apparatus for the vehicle of claim 3, wherein the two of the three rotation elements of the planetary gear set are the second rotation element and the third rotation element.

5. The power train apparatus for the vehicle of claim 3, wherein a third transmission device is provided to selectively connect the seventh shaft to the transmission housing or the second shaft so as to switch between a state in which the seventh shaft is fixed to the transmission housing and a state in which the seventh shaft is connected to the second shaft.

6. The power train apparatus for the vehicle of claim 1, wherein the first transmission device includes a sleeve selectively connecting a clutch gear of the fifth gear or a clutch gear of the sixth gear to a hub fixed on the fifth shaft.

7. The power train apparatus for the vehicle of claim 1, wherein the second transmission device includes a sleeve selectively connecting a clutch gear of the eleventh gear or a clutch gear of the twelfth gear to a hub fixed on the sixth shaft.

8. The power train apparatus for the vehicle of claim 1, wherein the first rotation element, the second rotation element and the third rotation element are a sun gear, a planet carrier and a ring gear, respectively.

9. A power train apparatus for a vehicle, the power train apparatus including:
   a planetary gear set including three rotation elements having a first rotation element, a second rotation element and a third rotation element, wherein the first rotation element is connected to a first shaft, the second rotation element is connected to a second shaft, and the third rotation element is connected to a third shaft;

a motor;

a first transmission device mounted to selectively transfer power of the motor to the first shaft in a plurality of gear ratios;

a second transmission device provided to selectively transfer the power of the motor to the first shaft or the second shaft; and a clutch device provided to distribute the power of the motor to the first transmission device or the second transmission device, wherein two of the three rotation elements of the planetary gear set are configured to be connected to each other, and the third rotation element of the planetary gear set is selectively connectable to a transmission housing, wherein the clutch device includes a first clutch operably mounted on a fourth shaft to selectively connect the motor to the fourth shaft and a second clutch operably mounted on a fifth shaft to selectively connect the motor to the fifth shaft, wherein the fourth shaft and the fifth shaft are aligned to be concentric with each other, wherein the first transmission device is mounted on a sixth shaft connected to the fourth shaft engaged to and parallel to the first shaft, wherein a first gear is mounted on the fourth shaft, wherein a second gear is mounted on the sixth shaft to be engaged with the first gear, wherein a fifth gear and a sixth gear are rotatably mounted on the sixth shaft and respectively engaged to a third gear and a fourth gear fixed on the first shaft, wherein the second transmission device is mounted on a seventh shaft engaged to the fifth shaft and parallel to the first shaft, wherein a seventh gear is mounted on the fifth shaft, wherein an eighth gear is mounted on the seventh shaft to be engaged with the seventh gear, and wherein an eleventh gear and a twelfth gear are rotatably mounted on the seventh shaft and engaged with a ninth gear and a tenth gear, respectively, the ninth gear being fixed on the first shaft and the tenth gear being fixed on the second shaft.

10. The power train apparatus for the vehicle of claim 9, wherein a third transmission device is provided to selectively connect the third shaft to the transmission housing or the second shaft so as to switch between a state in which the third shaft is fixed to the transmission housing and a state in which the third shaft is connected to the second shaft.

11. The power train apparatus for the vehicle of claim 9, wherein the first rotation element, the second rotation element and the third rotation element are a sun gear, a planet carrier and a ring gear, respectively.

12. The power train apparatus for the vehicle of claim 9, wherein the two of the three rotation elements of the planetary gear set are the second rotation element and the third rotation element.

13. A power train apparatus for a vehicle, the power train apparatus comprising:

a planetary gear set including three rotation elements having a sun gear and a planet carrier, where the sun gear is connected to a first shaft and the planet carrier is connected to a second shaft;

a motor;

a first transmission device mounted to selectively transfer power of the motor to the first shaft in a plurality of gear ratios;

a second transmission device provided to selectively transfer the power of the motor to the first shaft or the second shaft; and a clutch device provided to selectively transfer the power of the motor to the first transmission device or the second transmission device, wherein the clutch device includes a first clutch operably mounted on a third shaft to selectively connect the motor to the third shaft and a second clutch operably mounted on a fourth shaft to selectively connect the motor to the fourth shaft, wherein the third shaft and the fourth shaft are aligned to be concentric with each other, wherein the first transmission device is mounted on a fifth shaft connected to the third shaft engaged to and parallel to the first shaft wherein a first gear is mounted on the third shaft, wherein a second gear is mounted on the fifth shaft to be engaged with the first gear, wherein a fifth gear and a sixth gear are rotatably mounted on the fifth shaft and respectively engaged to a third gear and a fourth gear fixed on the first shaft, wherein the second transmission device is mounted on a sixth shaft engaged to the fourth shaft and parallel to the first shaft, wherein a seventh gear is mounted on the fourth shaft, wherein an eighth gear is mounted on the sixth shaft to be engaged with the seventh gear, and wherein an eleventh gear and a twelfth gear are rotatably mounted on the sixth shaft and engaged with a ninth gear and a tenth gear, respectively, the ninth gear being fixed on the first shaft and the tenth gear being fixed on the second shaft.

14. The power train apparatus for the vehicle of claim 13, wherein a third transmission device is provided to selectively connect a seventh shaft to a transmission housing or the second shaft so as to switch between a state in which the seventh shaft is fixed to the transmission housing and a state in which the seventh shaft is connected to the second shaft, and wherein the seventh shaft is connected to a ring gear engaged to the planet carrier.

* * * * *